(12) United States Patent
Turkia et al.

(10) Patent No.: US 8,898,243 B2
(45) Date of Patent: Nov. 25, 2014

(54) DEVICE RELAY CONTROL SYSTEM AND METHOD

(71) Applicants: Jani Turkia, Vilonia, AR (US); Billy R. Shurley, Jr., Little Rock, AR (US)

(72) Inventors: Jani Turkia, Vilonia, AR (US); Billy R. Shurley, Jr., Little Rock, AR (US)

( * ) Notice: Subject to any disclaimer, the term of this patent is extended or adjusted under 35 U.S.C. 154(b) by 0 days.

(21) Appl. No.: 14/246,957

(22) Filed: Apr. 7, 2014

(65) Prior Publication Data

US 2014/0300537 A1    Oct. 9, 2014

Related U.S. Application Data

(60) Provisional application No. 61/809,696, filed on Apr. 8, 2013.

(51) Int. Cl.
G06F 15/16    (2006.01)
G09B 5/00     (2006.01)
G06F 3/01     (2006.01)

(52) U.S. Cl.
CPC . *G09B 5/00* (2013.01); *G06F 3/017* (2013.01)
USPC ........................................................ 709/208

(58) Field of Classification Search
USPC ........................................................ 709/208
See application file for complete search history.

(56) References Cited

U.S. PATENT DOCUMENTS

| | | | | |
|---|---|---|---|---|
| 7,627,658 | B2 * | 12/2009 | Levett et al. | 709/223 |
| 7,733,366 | B2 * | 6/2010 | Beavers et al. | 348/14.08 |
| 8,156,115 | B1 * | 4/2012 | Erol et al. | 707/728 |
| 8,326,838 | B2 * | 12/2012 | Gaitas | 707/741 |
| 8,358,963 | B2 * | 1/2013 | Argott | 434/350 |
| 8,565,667 | B2 * | 10/2013 | Argott | 434/350 |
| 8,621,199 | B2 * | 12/2013 | Andress et al. | 713/153 |
| 2004/0255232 | A1 * | 12/2004 | Hammond et al. | 715/500 |
| 2005/0099432 | A1 * | 5/2005 | Chavis et al. | 345/619 |
| 2005/0102360 | A1 * | 5/2005 | Chavis et al. | 709/205 |
| 2008/0318200 | A1 * | 12/2008 | Hau et al. | 434/362 |
| 2009/0148824 | A1 * | 6/2009 | Argott | 434/307 R |
| 2010/0004944 | A1 * | 1/2010 | Palaniappan | 705/1 |
| 2010/0227304 | A1 * | 9/2010 | Horikawa | 434/350 |
| 2013/0176127 | A1 * | 7/2013 | Junqua et al. | 340/573.1 |
| 2013/0179472 | A1 * | 7/2013 | Junqua et al. | 707/796 |
| 2014/0053071 | A1 * | 2/2014 | Penner | 715/732 |
| 2014/0162243 | A1 * | 6/2014 | Lamkin | 434/365 |
| 2014/0164945 | A1 * | 6/2014 | Junqua et al. | 715/747 |
| 2014/0234824 | A1 * | 8/2014 | Schepman et al. | 434/350 |
| 2014/0280934 | A1 * | 9/2014 | Reagan et al. | 709/225 |
| 2014/0282013 | A1 * | 9/2014 | Amijee | 715/732 |

\* cited by examiner

*Primary Examiner* — Douglas Blair

(57) ABSTRACT

A device relay control synchronizes a primary control display device with one or more other display devices connected over a network. The system operates independently, without the need of specialized hardware, and requires only a network connection. The control facilitates synchronization, for example, between a teacher's manual and a student book in a digitized teaching environment, allowing a teacher to facilitate a page turn event on a student book without diverting attention from the teacher's manual.

14 Claims, 6 Drawing Sheets

DEVICE RELAY CONTROL SYSTEM AND METHOD

CROSS-REFERENCE TO RELATED APPLICATIONS

This application claims the benefit of U.S. provisional patent application No. 61/809,696, entitled "Multiple Output Device Relay Control," filed on Apr. 8, 2013. Such application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates to electronic presentation systems for facilitating improved presentations and collaboration across computer networks.

As classrooms and businesses worldwide move into the realm of integrated digital education and professional development, teachers and trainers alike are confronted with even greater instructional challenges. For example, teachers who currently teach using digital books may use a local classroom computer to control how content is presented. This is often done by projecting the student content on a wall or interactive board so that the class can follow along. However, the teacher must use a separate teacher's manual to teach from during such a presentation. With the teacher projecting one book and teaching from a separate book, the teacher must physically manipulate the classroom computer in order to keep the displayed student content on the same page as what is being taught by the teacher from his or her book. This manual manipulation of two electronic devices to keep the two books continually synchronized during class is a persistent waste of time throughout the instructional day.

In addition, in today's digital class without automated controls, a teacher must continuously monitor the digital devices being used in order to ensure that the students are using them for educational purposes during class time.

It may be seen then that teachers and trainers need control over one or more display devices simultaneously, and that alleviating the need to manually control each display device, where the primary and remote devices may or may not display the same content, would save invaluable instructional time and avoiding disruptions during lessons/presentations.

BRIEF SUMMARY OF THE INVENTION

The present invention is directed to a system and method that synchronizes a primary control display device with one or more other display devices, such that materials displayed on the two devices remain synchronized, even though those materials are distinct from each other but related. The system operates independently, without the need of specialized on-site hardware, and requires only a network connection. The present invention overcomes the problems of synchronizing, for example, between a teacher's manual and a student book in a digitized teaching environment. The invention may also provide a teacher with control over electronic devices in a classroom environment to ensure that the devices are being used for the intended instructional purposes during classroom time.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
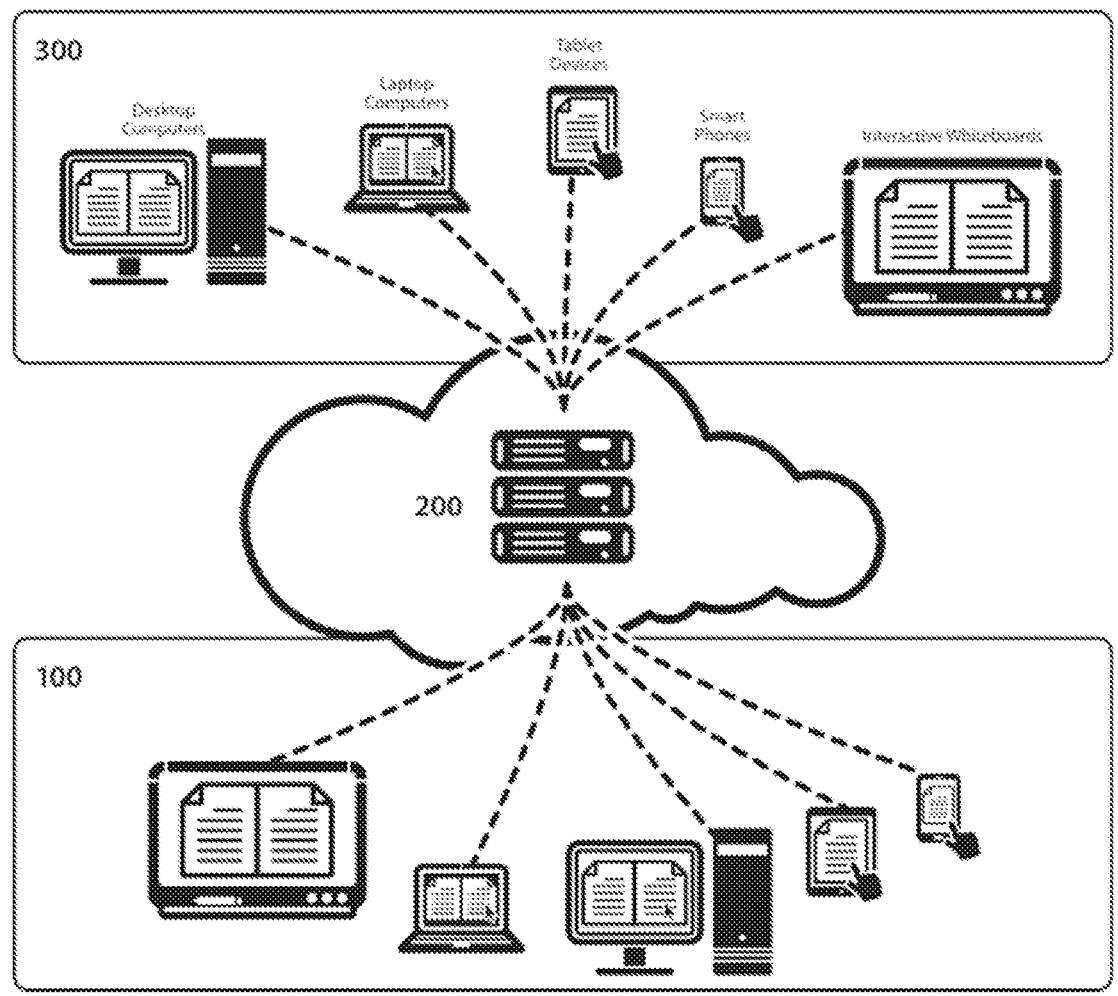
FIG. 1 is a schematic diagram illustrating components of a preferred embodiment of the present invention.

FIG. 1 illustrates an example of a suitable computing system environment on which the invention may be implemented. This computing system environment is only one example of a suitable computing environment and is not intended to suggest any limitations as to the scope of use or functionality of the invention. Neither should the computing environment be interpreted as having any dependency or requirement relating to any one or combination of components illustrated in the exemplary operating environment.

The invention in various embodiments is operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablet or other mobile devices, multiprocessor systems, microcontroller-based systems, set top boxes, programmable consumer electronics, network PCs, minicomputers, mainframe computers, or distributed computing environments that include any of the above systems or devices, and the like.

The invention may be described in the general context of computer-executable instructions, such as program modules, being executed by two or more computers. Generally, program modules include routines, programs, objects, components, data structures, and so forth, which perform particular tasks or implement particular abstract data types.

The preferred embodiment of the present invention is generally directed towards reacting to specific user input to manipulate an output device(s) (e.g., a system projecting a presentation) by means of another device. The result is that if the state of the controlling device is changed, a corresponding change occurs on one or more output devices. The content displayed on the controlling device(s) may or may not be the same content that is displayed on the output device. The content on each device is independent of the other; therefore, the output device's display is not a replica of the controlling device's display. However, the content can be the same if the user chooses.

It may be understood that numerous ways to implement the present invention are feasible, and only some of the alternatives are described herein in various embodiments. For example, the preferred embodiment of the present invention is primarily described below as a presentation system consisting of a control device, an intermediary server, and an output device. However, this is not necessary to the present invention; and, for example, the output device(s) could consist of a number of other display devices. As such, the present invention is not limited to any particular examples or implementations described herein, but rather may be used in various ways that provide benefits and advantages for computing in general.

Figure 2:
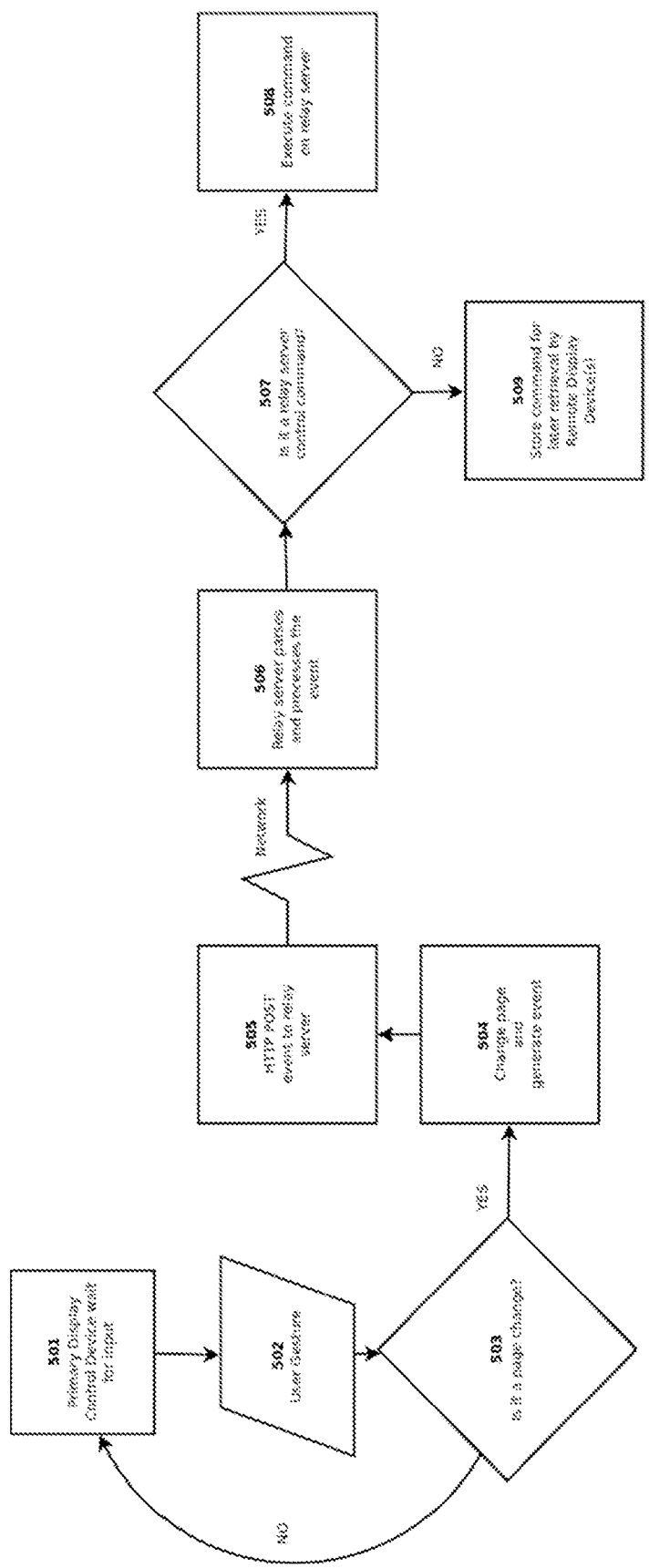
FIG. 2 is a flow chart illustrating a control process on a primary display device according to a preferred embodiment of the present invention.
Figure 3:
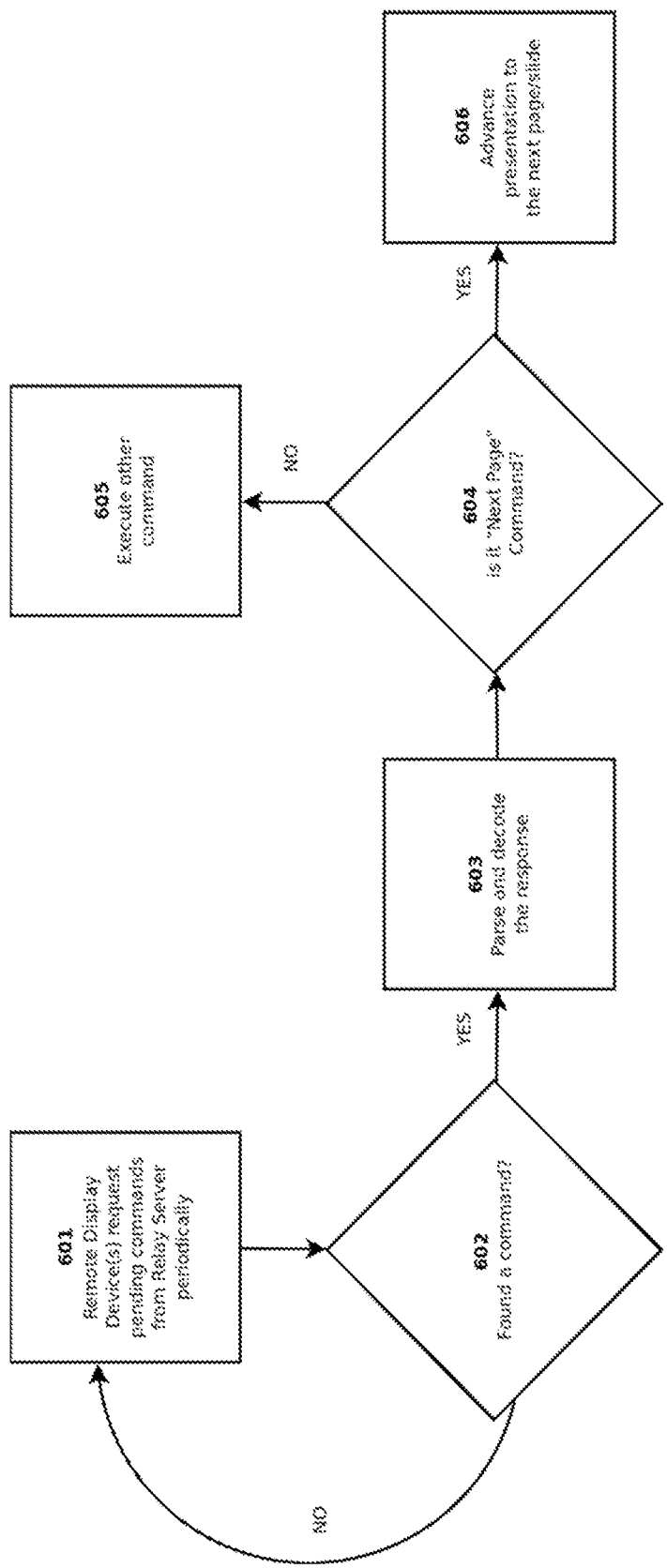
FIG. 3 is a flow chart illustrating a control process on a remote display device according to a preferred embodiment of the present invention.

Turning to FIGS. 1, 2, and 3, there is shown a diagram representing an exemplary configuration in which the preferred embodiment of the present invention may operate in accordance with various aspects of the invention. The configuration includes one of each or multiple combinations of a Primary Display Control Device 100, a Remote Display Device 300, and a Relay Server Device 200 accessible by both (100 and 300) systems over a communication network or a combination of communication networks. The Primary Display Control Device 100 and Remote Display Device 300 may or may not display the same content. In various embodiments, the content displayed on the Primary Display Control Device 100 may be teaching content, and the material displayed on the Remote Display Device 300 may be student content that is coordinated with the teaching content. In accordance with a preferred embodiment of the present invention, the Primary Display Control Device(s) 100 will send control commands to the Remote Display Device(s) 300 using a predefined protocol (e.g., XML or JSON messages) transmitted over the communication network(s). As the user interacts with the content displayed on the Primary Display Control Device(s) 100, the content on the Remote Display Device(s) 300 will respond in a predefined manner. For example, the Primary Display Control Device 100 may receive a page turn command, that will result in a page turn response on the Remote Display Device 300 depending upon the predefined behavior. The Remote Display Device(s) 300 may post a response back for the Primary Display Control Device(s) 100 if it so chooses. In certain embodiments involving direct connections, Relay Server Device 200 may be eliminated such that Primary Display Control Device 100 and Remote Display Device 300 communicate directly, in some embodiments via a wired network.

Following is a detailed description of an example of a single stateless transaction between the Primary Display Control Device 100 and the Remote Display Device 300, both using a Java Servlet Engine as the Relay Server Device 200. In this example, the Primary Display Control Device 100 in the preferred embodiment consists of a 10-inch diagonal diameter mobile tablet device. The Remote Display Device 300 contains a laptop computer connected to a projection system. The Primary Display Control Device 100 and the Remote Display Device 300 are connected to the Internet using wireless technology and the Relay Server Device 200 is connected to the Internet via a wired network.

To initiate a control event on the Primary Display Control Device 100, the user performs, for example, a horizontal touch gesture 502 in approximately 0.5 seconds from right to left for approximately 1.5 inch length on the tablet's surface. This touch event, and any other event triggered by the user by interacting with an input for Primary Display Control Device 100, will be referred to herein simply as an "event." The event, in various embodiments, will be processed taking into account the location, length, speed (velocity and direction) and context of the touch. Due to the distance traveled and the speed and length of the touch, the event as described above is translated into a fling type event 503 causing the currently displayed page on the tablet to be replaced by the next available page in the presentation 504. The page change creates an event that is detected and processed to build a control message using XML. The following is an example of such control message:

```
<?xml version="1.0"?>
<Request>
    <Message action="NextPage"/>
</Request>
```

The message is then posted to the Relay Server Device 200 using an HTTP POST request 505. Once the Relay Server Device 200 parses and interprets the request 506 (example code for which is provided below), it will store the command in a database 509 for retrieval by the Remote Display Device 300. In the case that the command is determined to be a relay server command at step 507, processing moves to executing the command on the relay server 508.

The Remote Display Device 300 polls the Relay Server Device 200 by sending command requests at fixed or variable intervals 601. Following is an example of such request:

```
<?xml version="1.0"?>
<Request>
    <Message action="GetCommand"/>
</Request>
```

The message is posted to the Relay Server Device(s) 200 using an HTTP POST request. Once the Relay Server Device 200 determines that a Remote Display Device 300 is requesting commands, it will query the database for any pending commands it has received from the Primary Display Control Device 100 and build an XML response to return back to the requesting client as the HTTP POST response 602.

Once the Remote Display Device 300 receives the response from the Relay Server Device 200, it will parse and interpret the XML message 603 and execute the requested commands. In the case presented in this example, the command "NextPage" 604 will cause the Remote Display Device 300 to advance the currently displayed page to the next available page in the presentation 606 (example code for which is provided below).

Due to the cached or persistently stored content at both the Primary Display Control Device 100 and the Remote Display Device 300, the bandwidth requirement for remote control and interaction is very low allowing the system to operate over slow communication pathways.

In various embodiments, each page turn at Primary Display Control Device 100 may not necessarily trigger a "NextPage" command at 604, depending upon the particular synchronization between the two. For example, a teacher's manual may have multiple pages that coordinate to a single page in a student textbook. The teaching manual may contain additional material on these pages associated with the single page in the student textbook, such as additional exercises, teaching tips, answers to problems, and the like. Moving between pages on the teaching manual at Primary Display Control Device 100 may not cause a "NextPage" command to be issued at Remote Display Device 300 as long as the next page turned to at Primary Display Control Device 100 still corresponds to the same page in the student textbook displayed at Remote Display Device 300. Only when a page is reached at Primary Display Control Device 100 that corresponds to a new page on the student textbook displayed at Remote Display Device 300 does the page advance at Remote Display Device 300.

Because of the polling feature described above, the preferred embodiment operates to keep persons operating a Remote Display Device 300 from navigating away from the appropriate page. If the user at Remote Display Device 300 moves away from the page corresponding to the displayed page at Primary Display Control Device 100, then the next polling request will serve to reset the display at Remote Display Device 300 to the proper page. In this way, for example, a teacher may ensure that students remain on the appropriate page in a classroom environment. Additionally in various embodiments, Primary Display Control Device 100 may include an option to monitor each of a plurality of Remote Display Devices 300 to ensure that the textbook or other material is the active "app" being displayed at Remote Display Devices 300. This ensures that in a classroom environment, for example, students who are using a remote display device 300 are properly following the course material, and not using the Remote Display Device 300 for other purposes.

In various embodiments, the display at Primary Display Control Device 100 may include additional material that can be activated at Primary Display Control Device 100 for display on Remote Display Device 300. For example, a button or other control may be presented that activates additional video, audio, or audiovisual materials, as desired by the operator of Primary Display Control Device 100. In a classroom teaching example, such material could include animations coordinated with a particular page in a student textbook, music, and the like. Further in various embodiments, the display at Primary Display Control Device 100 may allow for the operator to write or draw on the displayed material, and thereby cause the writing or drawing thus created to appear on the display at Remote Display Device 300.

Figure 4:
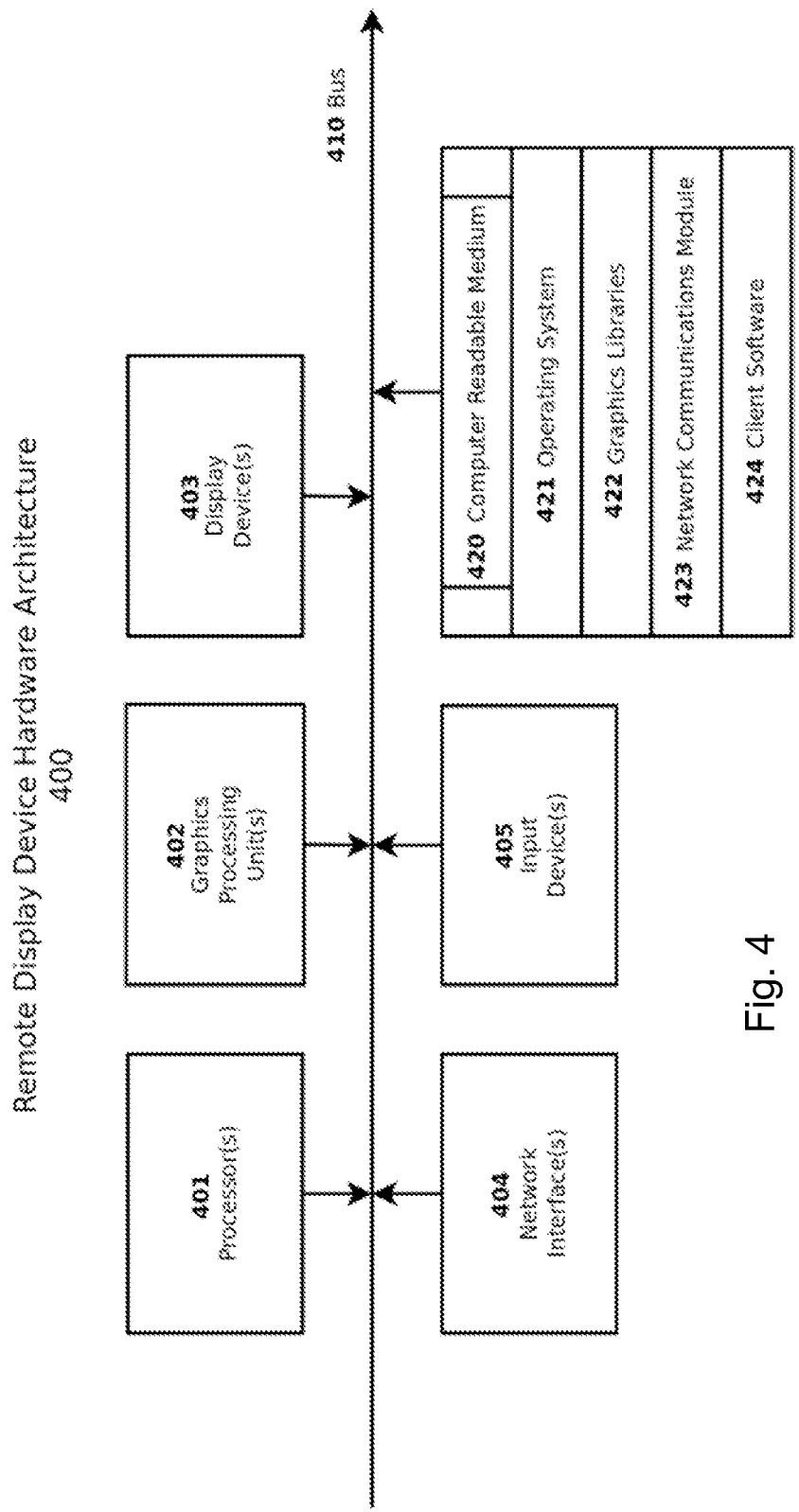
FIG. 4 is a schematic diagram of a hardware architecture for a remote display device according to a preferred embodiment of the present invention.

FIG. 4 is a block diagram of an exemplary hardware architecture 400 for a remote display device. The architecture 400 includes one or more processors 401 (e.g., AMD Athlon and Intel Pentium), one or more graphics processing units (GPUs) 402 (e.g., NVIDIA GeForce 8800, AMD Radeon HD 7700, and Intel HD Graphics 4000), one or more display devices 403 (e.g., LCD, SMART Board 680, and Promethean ActivBoard 500 Pro), one or more network interfaces 404 (e.g., Ethernet, WiFi, FireWire, and USB), one or more input devices 405 (e.g., keyboard and mouse), and one or more computer-readable mediums 420 (e.g. SDRAM, optical disks, hard disks, flash memory, and L1 or L2 cache). These components communicate and exchange data via one or more buses 410 (e.g., PCI, PCI Express, SCSI, and SATA).

The term "computer-readable medium" refers to any medium that participates in providing instructions to a processor 401 for execution, including without limitation, non-volatile media (e.g., optical, magnetic, or flash disks), volatile media (e.g., memory) and transmission media. Transmission media includes, without limitation, coaxial cables, copper wire and fiber optics. The computer-readable medium 420 further includes an operating system 421 (e.g., Mac OS X, Windows, and Linux), graphics libraries 422 (e.g., OpenGL and DirectX), a network communication module 423, and client software 424.

The operating system 421 can be multi-user, multiprocessing, multitasking, multithreading, real-time and the like. The operating system 421 performs basic tasks, including but not limited to: recognizing input from input devices 405; sending output to display devices 403; keeping track of files and directories on computer-readable mediums 420 (e.g., memory or a storage device); controlling peripheral devices and processors (e.g., disk drives, printers, and GPUs); and managing traffic on the one or more buses 410. The network communications module 423 includes various components for establishing and maintaining network connections (e.g., software for implementing communication protocols, such as TCP/IP, HTTP, SSL, and Ethernet).

The client software 424 is responsible for receiving input from the Primary Display Control Device 100 and providing appropriate output to the Display Device(s) 403 based on requested content and actions. The client software 424 may or may not also send feedback or other state information back to the Primary Display Control Device 100 as needed.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit) or other customized circuitry.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a device having a display, e.g., an LCD (liquid crystal display) monitor or projector, for displaying information to the user and an input device, e.g., a keyboard, a mouse, a trackball, and the like by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in, e.g., a computing system, a handheld device, a telephone, a consumer appliance, or any other processor-based device. A computing system implementation can include a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

Example code for relay server parsing and processing an event at step 506 of FIG. 2 may be as follows:

```
xml = new XmlBuilder( );
xml.header( ).open("WEB_Response").open("AppMessage");
if (msg.openTag("AppMessage") < 1) {
    // error
    xml
        .open("Error")
        .attr("code", ErrorCode.INVALID_REQUEST)
        .attr("desc", ErrorCode.INVALID_REQUEST.text( ))
        .close( )//Error
        ;
} else {
    while (msg.next( )) {
        String op = msg.getNodeValue("op");
        if ("Register".equalsIgnoreCase(op)) {
            a = register(msg, xml, a, rq);
        } else if ("Associate".equalsIgnoreCase(op)) {
            associate(msg, xml, a, rq);
        } else if (null != a) { // these here require a valid auth context
            if ("SlavePoll".equalsIgnoreCase(op)) {
                slavePoll(msg, xml, a, rq);
            } else if ("MasterPoll".equalsIgnoreCase(op)) {
                masterPoll(msg, xml, a, rq);
            } else if ("Do".equalsIgnoreCase(op)) {
                processDo(msg, xml, a);
            } else if ("getServiceDetail".equalsIgnoreCase(op)) {
                getServiceDetail(msg, xml, a, rq);
            } else if ("Logout".equalsIgnoreCase(op)) {
                logout(a, rq);
            } else if ("Disassociate".equalsIgnoreCase(op)) {
                disassociate(msg, xml, a, rq);
            } else {
                xml.attr("error", "invalid op: " + op);
                util.ctx( ).log.debug("invalid op: " + op);
            }
        } else {
            util.ctx( ).log.debug("need to login");
            xml
                .open("Error")
                .attr("code", ErrorCode.NOT_LOGGED_IN)
                .attr("desc",
ErrorCode.NOT_LOGGED_IN.text( ))
```

-continued

```
                .close( )//Error
                ;
        }
    }
    msg.closeTag( );//AppMessage
}
xml.close( ).close( );
```

Example code for advancing the presentation to the next page or slide at step 606 of FIG. 3 according to a preferred embodiment of the present invention may be as follows:

```
private function pagePollHandler(evt:Event):void {
    var xml:XML = XML(evt.target.data);
    var error:String = String(xml.child("Response")[0].attribute("error"));
    if (error) {
        // get protocol/host
        var parts:Array = this.loaderInfo.url.split(':///');
        var protocol:String = parts.shift( );
        parts = parts[0].split('/');
        var host:String = parts.shift( );
        // relocate
        var url:String = protocol + "://" + host + "/ols/";
        SwfOverlayApi.gotoAddress("javascript:window.location.href=\"" + url
+ "\"");
    } else {
        var realPage:Number = -1;
        var attr:XMLList = xml.child("Response")[0].@gotoPage;
        if (attr.length( )) {
            var page:Number = Number(attr);
            realPage = page;
            if (((int)(page / 2) * 2) != page) {
                page -= 1;
            }
            if (page >= 0 && page != currentPage) {
                SwfOverlayApi.gotoAddress("page:" + page);
            }
        }
        var mc:MovieClip;
        if (ldr.content) {
            mc = ldr.content as MovieClip;
        }
        if (xml.child("Response")[0].child("iContent").length( )) {
            // do menu action
            var item:XML = xml.child("Response")[0].child("iContent")[0];
            menuCallback({ label_str:item.@text, url_str:item.@url, icon:null,
type_str:item.@type, action_str:item.@action, id_str:item.@id });
        } else if (xml.child("Response")[0].child("Play").length( )) {
            if (mc) {
                mc.currentPlayer.play( );
            }
        } else if (xml.child("Response")[0].child("Stop").length( )) {
            if (mc) {
                mc.currentPlayer.pause( );
            }
        } else if (xml.child("Response")[0].child("Close").length( )) {
            // do close action
            var typeAttr:XMLList =
xml.child("Response")[0].child("Close").@type;
            if (typeAttr.length( )) {
                var type:String = String(typeAttr);
                if ("iwb" == type) {
                    me.graphics.clear( );
                    closeIWB( );
                } else {
                    // any other type
                    closeCallback( );
                }
            }
        } else if (xml.child("Response")[0].child("Gfx").length( )) {
            if (IWBActive) {
                updateIWB(xml.Response.Gfx[0]);// post paths to Portal
            } else {
                if (xml.Response.Gfx.child("Path").length( ) <= 0) {
                    me.graphics.clear( );
                } else {
```

```
            for each (var path:XML in xml.Response.Gfx.Path) {
                var colorString:String = path.attribute("color");
                if (colorString) {
                    var c:uint = uint("0x" + colorString.substr(3));
                    me.graphics.lineStyle(3, c, .75, true);
                } else {
                    // NOP don't alter line style
                }
                for each (var pt:XML in path.children( )) {
                    var x:Number = pt.@x * 613 * 1200 / 780;
                    var y:Number = pt.@y * 783 * 1536 / 1000 - (30 * 783 / 1000);
                    if (realPage % 2 > 0) {
                    } else {
                        x -= (420 * 613 / 780);
                    }
                    if (realPage % 2 > 0) {
                        x += 1225 / 2;
                    }
                    if (pt.name( ) == "LineTo") {
                        me.graphics.lineTo(x, y);
                    } else if (pt.name( ) == "MoveTo") {
                        me.graphics.moveTo(x, y);
                    }
                }
            }
        }
    }
}
```

The following scenarios illustrate how the multiple output device relay control according to a preferred embodiment of the present invention empowers users by enabling seamless interactive collaboration and communication.

Figure 5:
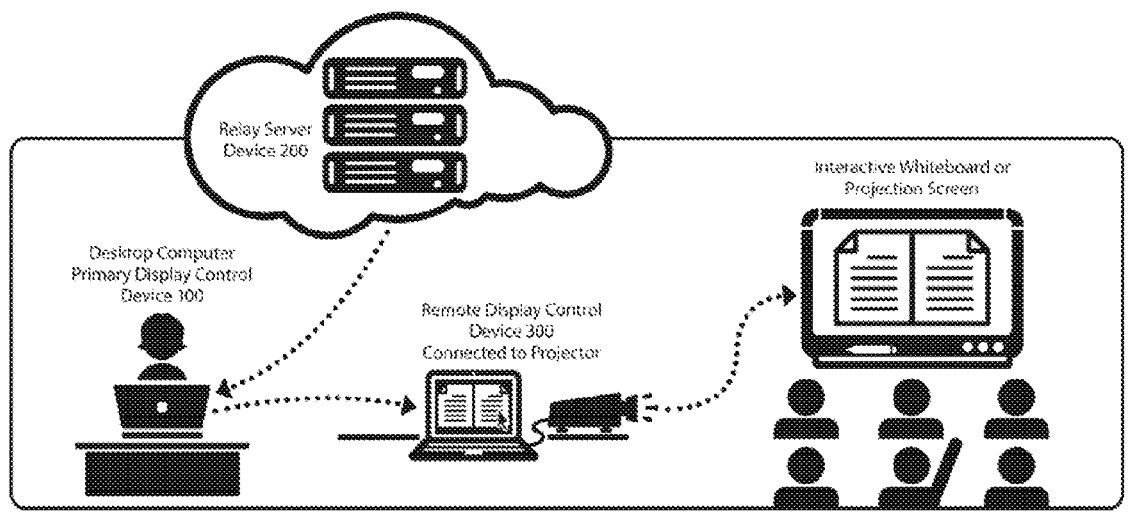
FIG. 5 illustrates a first scenario of using a preferred embodiment of the present invention.

In a first scenario illustrated in FIG. 5, a third grade school teacher, named Jane, has access to her classroom teaching materials digitally. Jane uses a desktop computer (Primary Display Control Device 100) to log onto a service designed to access digital school materials (for example, Shurley Online Services Portal, provided by Shurley Instructional Materials, Inc. acts as the Relay Server Device 200) and uses the service to display her teacher's manual. Jane then logs onto the same service using the classroom laptop computer (Remote Display Device 300), attached to a projector, to project the student textbook for the entire class to see.

Once Jane finishes teaching the current page, she flips the page on her desktop computer (Primary Display Control Device 100) and the system (Relay Server Device 200) recognizes the page change and then responds by turning the page on the classroom laptop computer (Remote Display Device 300) to the corresponding student book page. The system thus operates without the need to stand near or walk up to the classroom laptop computer (Remote Display Device 300) to keep the student book in synchronization with what is being taught by the teacher. This enables Jane to continue teaching without the need to disrupt the flow of the lesson, saving the teacher valuable teaching time in the classroom.

Figure 6:
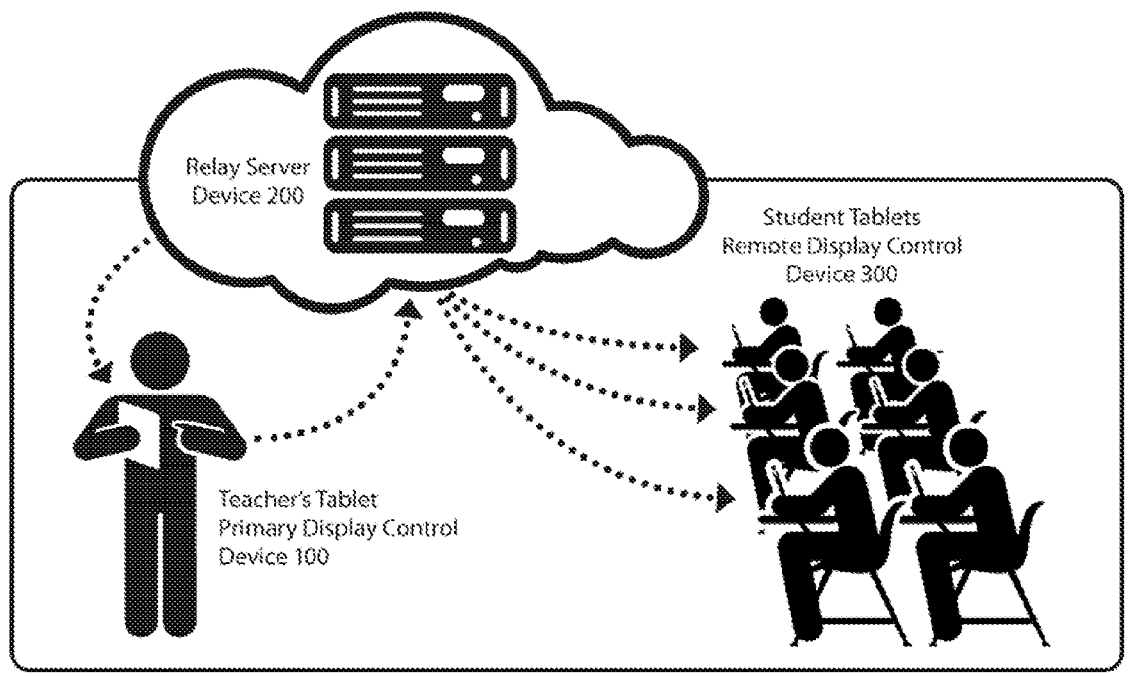
FIG. 6 illustrates a second scenario of using a preferred embodiment of the present invention.

In a second scenario illustrated in FIG. 6, a seventh grade school teacher, named David, teaches at a technologically advanced school. At David's school, each student is issued a personal tablet device to use. Like Jane, David also uses a service designed to access his digital school materials (Relay Server Device 200).

David logs onto the service using his tablet device to view his teacher materials (Primary Display Control Device 100). Each student in David's class also logs onto the service utilizing their personal student tablet device (Remote Display Devices 300) to display their student materials. While David is teaching, the students are following along with the lesson on their individual tablet devices (Remote Display Devices 300). As David is walking around the classroom teaching, he changes the page on his tablet (Primary Display Control Device 100). The system (Relay Server Device 200) recognizes the page change on David's tablet device (Primary Display Control Device 100) and responds by turning the page on each of the students' tablet devices (Remote Display Devices 300). This allows David to walk freely around the classroom to monitor and assist with the learning process. The materials being taught by David includes digital enhancements that enhance the lesson being taught. Without the need to close/leave the book, David taps on the interactive feature on his tablet (Primary Display Control Device 100). The interactive feature is displayed on each of David's students' devices (Remote Display Devices 300). David is able to alter the image and sound that is being displayed on all of the (Remote Display Devices 300) from his tablet (Primary Display Control Device 100). After the digitally enhanced content is taught, David taps the close button on his tablet (Primary Display Control Device 100) and the content is closed on all the student devices (Remote Display Devices 300).

Because David can remotely control the content being displayed on the students' tablet devices (Remote Display Devices 300), he can help his students remain on task and can take full advantage of integrated interactive features without the need for each student to individually open the interactive feature and follow along with lengthy "tap here and here" instructions.

Figure 7:
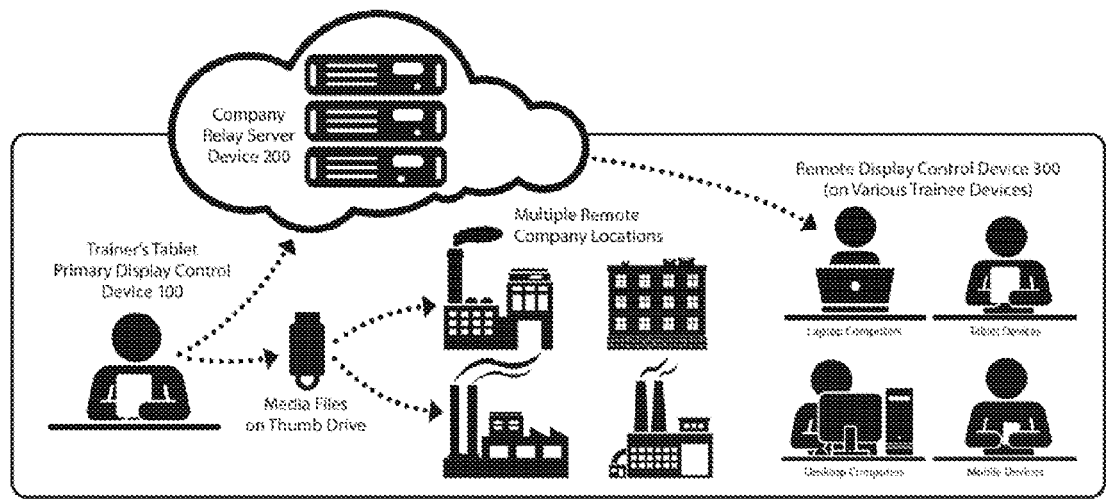
FIG. 7 illustrates a third scenario of using a preferred embodiment of the present invention.

In a third scenario illustrated in FIG. 7, a large business, located in the United States, has manufacturing plants in 15 different countries around the world. With the onset of new manufacturing technology, the business has decided to update their machines. All plant operators will need training. With the diverse time difference and location of each plant, the business wants to train the machine operators remotely.

Ted, the company's Manufacturing Trainer, uses Multiple Output Device Relay Control to set up virtual training for all his operators. Since Multiple Output Device Relay Control does not require high bandwidth, even operators with poor or inadequate internet connections are able to use the system. To initiate the new training sessions, Ted makes his training presentation available on the company server (Relay Server Device 200) for download and also sends the presentation via a thumb drive to the remote locations where internet connectivity is poor. Ted is sure to include all files on the thumb drive that will be needed during the presentation. After downloading or receiving the presentation via thumb drive, the trainees access the company server (Relay Server Device 200) using a combination of tablets, laptops, and desktop computers, while at different manufacturing locations around the world. For example, Juan uses a laptop (Remote Display Device 300) in Mexico while projecting it on a wall in the conference room for everyone at that location to see. Jose uses the computer at his desk (Remote Display Device 300) in Spain. Ted, located in the United States, is able to conduct and control the pace of the training presentation to all his manufacturing locations from his tablet (Primary Display Control Device 100). With a conference call set up, Ted reads a step-by-step guide from his tablet (Primary Display Control Device 100). Since the presentation and all corresponding files are on each of the remote devices (Remote Display Device 300), as Ted advances through the presentation he is able to click on videos, diagrams, and pictures from his tablet (Primary Display Control Device 100) and the corresponding action shows up on each of the Plant operator's devices (Remote Display Devices 300). Even the remote manufacturing locations with poor internet are able to see the graphically enhanced videos, diagrams, and pictures as Ted talks about them during his presentation since the company server (Relay Server Device 200) is only sending bytes of data to the remote devices (Remote Display Devices 300) telling them what to display. Since the corresponding videos, diagrams, and pictures are already on the remote device (Remote Display Devices 300), no large download or major bandwidth is needed.

Ted is able to train employees around the world on new state of the art manufacturing technologies by controlling the content being displayed remotely to each of his Plant Operators. This allows a content-rich presentation that includes videos, diagrams, and pictures to be seen in real time even to locations with poor internet service.

Figure 8:
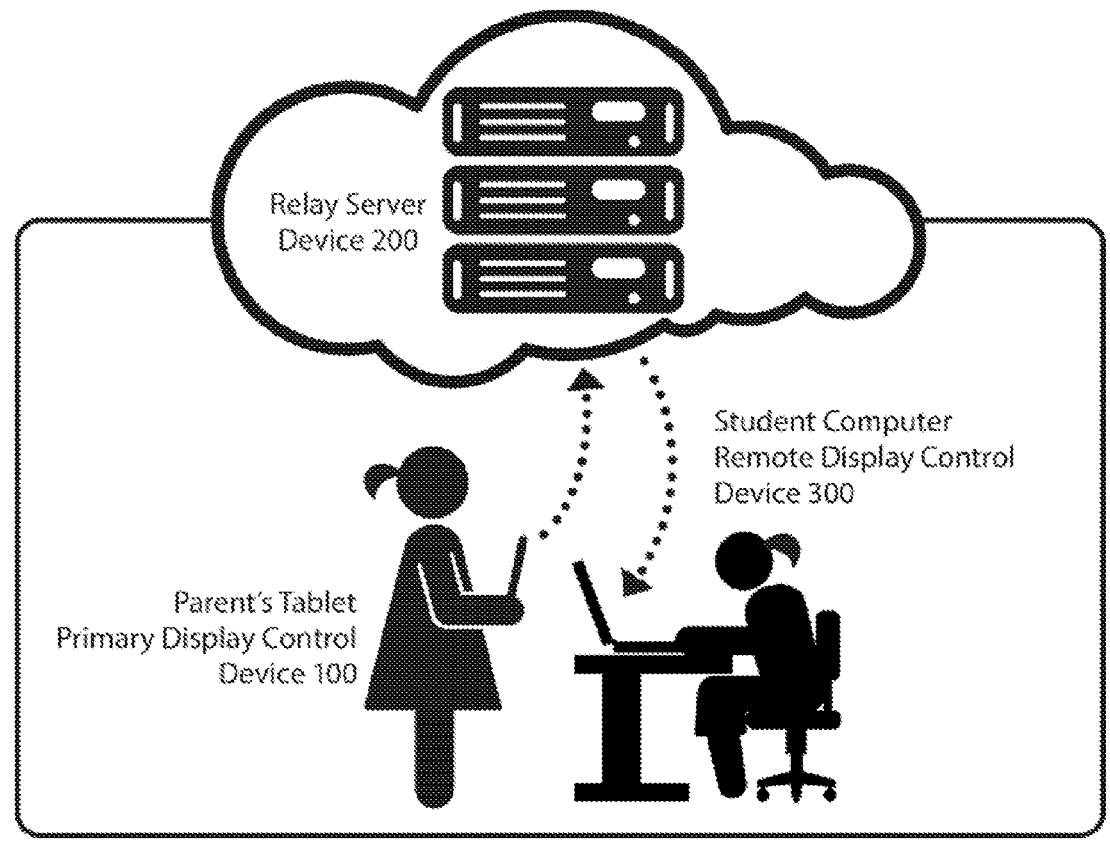
FIG. 8 illustrates a fourth scenario of using a preferred embodiment of the present invention.

In a fourth scenario illustrated in FIG. 8, LeAnne is a mother that homeschools her ten-year-old daughter, named Karmen. LeAnne uses all online homeschooling curricula. LeAnne uses her tablet device (Primary Display Control Device 100) to log onto a service designed to access her digital homeschooling materials (for example, Shurley Online Services Portal, provided by Shurley Instructional Materials, Inc. acts as the Relay Server Device 200). Karmen uses the same service from her desktop computer to view the student materials (Remote Display Device 300).

LeAnne opens her teacher's manual to page 65 on her tablet (Primary Display Control Device 100). Karmen's student book that is being displayed on her desktop computer (Remote Display Device 300) automatically synchronizes with LeAnne's tablet (Primary Display Control Device 100). LeAnne is able to sit beside Karmen and teach from her teacher's manual while Karmen follows along on her desktop computer. Once LeAnne finishes teaching a page, she flips the page on her tablet (Primary Display Control Device 100), and the system (Relay Server Device 200) recognizes the page change and then responds by turning the page on the desktop computer (Remote Display Device 300) to the corresponding student page. This functionality enables LeAnne to teach from another device without having to display the teaching materials to her daughter where the answers are displayed, allowing for seamless digital interaction.

It may be seen from the above description that in various embodiments the invention is well adapted to use in a "flip teaching" environment, whereby students learn new content online outside of the classroom, and then discuss the material or work problems afterward within the classroom environment. Students may review digitized textbooks, videos, and other material at Remote Display Device 300 prior to a classroom session, optionally with recorded video and/or audio teaching provided with the material. Afterward, during the classroom session, Remote Display Device 300 may be synchronized with Primary Display Control Device 100 as described herein to review the material already learned and work problems or discuss within the classroom.

As can be seen from the foregoing detailed description, there is provided a method and system that allows users to manipulate content on one or more display devices simultaneously. The method and system can, in various embodiments, be implemented using commodity hardware and existing communication networking technologies.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A computer-implemented method for synchronizing a primary display control device generating a first display with a remote display device generating a second display, the computer-implemented method comprising the steps of:
   a. receiving at a relay server device at least one control message from the primary display control device, wherein the control message indicates an event at the first display of the primary display control device, and wherein the first display comprises a first portion of a teaching material prior to the event and a second portion of a teaching material subsequent to the event;
   b. storing the at least one control message in a database communicatively connected to the relay server device;
   c. receiving a poll message from the remote display device, wherein the second display at the remote display device comprises a first portion of a student material, and further wherein the student material is related to but not identical to the teaching material;
   d. in response to the poll message, querying the database connected to the relay server device for any stored control messages;
   e. building a response message for each of the at least one stored control messages, and sending the response message to the remote display device, wherein the response message indicates an action at the remote display device corresponding to the event at the primary display control device whereby the second display changes from a first portion of the student material to a second portion of the student material.

2. The computer-implemented method of claim 1, wherein the event is a user gesture at an input of the primary display control device.

3. The computer-implemented method of claim 2, wherein the event is a page change or a slide turn, and wherein the action at the remote display device is a page change or a slide turn.

4. The computer-implemented method of claim 3, wherein the relay server device receives a control message from the primary display control device only if the page change or slide turn event at the teaching material on the first display corresponds to a page change or slide turn action at the student material on the second display.

5. The computer-implemented method of claim 1, further comprising the step of parsing the control message at the relay server device to determine if it comprises a relay server control command, and if so executing the relay server control command on the relay server.

6. A relay service device, comprising:
   a. a processor; and
   b. a non-transitory computer-readable medium in communication with the processor;
   wherein the processor is configured to execute program code embodied in the non-transitory computer-readable medium to perform operations comprising:
      receiving a control message from a primary display control device indicating an event;
      storing the control message in a storage medium;
      receiving a polling request from a remote display device;
      searching the storage medium for the stored control message; and
      sending a response message to the remote display device, wherein the response message indicates an action at the remote display device,
   wherein the event corresponds to a teaching material and the action corresponds to a student material, and further wherein the student material comprises a subset of the teaching material.

7. The relay service device of claim 6, wherein the event is a user gesture at an input of the primary display control device.

8. The relay service device of claim 7, wherein the event is one of a page change or a slide turn, and wherein the action at the remote display device is one of a page change or a slide turn.

9. A device relay control system, comprising:
   a. a relay server device comprising a relay server device processor and a computer readable storage medium having relay server device program code embodied therewith;
   b. a primary display control device comprising a primary display control device processor, an input, and a computer readable storage medium having primary display control device program code embodied therewith and a teaching material, the primary display control device program code executable by the primary display control device processor to: display the teaching material; receive an event at the input; build a control message in response to the event; post the control message to the relay server device; and
   c. a remote display device comprising a remote display device processor, an output, and a computer readable storage medium having remote display device program code embodied therewith and a student material, the remote display device program code executable by the remote display device processor to: display the student material; poll the relay server device; receive a response from the relay server device; and build a display at the output in response to the response from the relay server device,
   wherein the relay server device program code is executable by the processor to: receive the control message from the primary display control device; store the control message; receive a poll from the remote display device; and in response to the poll, send a response to the remote display device.

10. The device relay control system of claim 9, wherein the teaching material comprises the student material and teacher material.

11. The device of claim 10, wherein the teacher material comprises problem answers.

12. The device relay control system of claim 9 comprising a plurality of remote display devices.

13. The device relay control system of claim 9, further comprising a network communicatively connecting the primary display control device to the relay service device, and the remote display device to the relay server device.

14. The device relay control system of claim 9, wherein the primary display control device program code is executable by the primary display control device processor to only build a control message in response to the event if the event corresponds a change in the display of the student material.

* * * * *